United States Patent [19]

Kruse

[11] 4,196,561

[45] Apr. 8, 1980

[54] PACKAGING MACHINE WITH INTERCHANGEABLE CONTAINER SUPPORTS AND CAM-OPERATED CUTTER

[75] Inventor: Gary L. Kruse, Spring Lake, Mich.

[73] Assignee: Dake Corporation Division of JSJ Corporation, Grand Haven, Mich.

[21] Appl. No.: 904,216

[22] Filed: May 9, 1978

[51] Int. Cl.² .......................... B65B 7/28; B65B 41/16
[52] U.S. Cl. .......................... 53/300; 53/373;
53/389; 83/285; 83/297; 83/352; 198/341;
198/648
[58] Field of Search ................. 53/296, 297, 298, 329,
53/373, 389, 300, 282; 83/352, 350, 285, 297,
308; 198/648, 793, 341

[56] References Cited

U.S. PATENT DOCUMENTS

| 563,252 | 7/1896 | Bensing | 83/308 X |
|---|---|---|---|
| 719,722 | 2/1903 | Bechtel | 83/307.1 |
| 853,858 | 5/1907 | Bechtel | 83/307.1 |
| 2,648,183 | 8/1953 | Dalton | 53/389 |
| 3,040,874 | 6/1962 | Lyman | 198/181 |
| 3,246,734 | 4/1966 | Carvallo | 198/189 |
| 3,436,894 | 4/1969 | Sorensen | 53/329 |
| 3,457,699 | 7/1969 | Kinney et al. | 53/373 |
| 3,490,196 | 1/1970 | Sorensen | 53/389 X |
| 3,553,930 | 1/1971 | Anderson et al. | 53/329 X |
| 3,587,829 | 6/1971 | Sorensen | 198/131 |
| 3,590,973 | 7/1971 | Sorensen | 198/25 |
| 3,625,338 | 12/1971 | Cawley | 198/35 |
| 3,706,175 | 12/1972 | Anderson | 53/329 X |
| 3,706,183 | 12/1972 | Talarico | 53/329 |
| 3,851,445 | 12/1974 | Schuh | 53/329 |
| 3,975,887 | 8/1976 | Clymer | 53/373 |
| 4,056,922 | 11/1977 | Schilte | 53/300 |

FOREIGN PATENT DOCUMENTS

596287 4/1934 Fed. Rep. of Germany .
217432 6/1924 United Kingdom .
417800 10/1934 United Kingdom .

Primary Examiner—Horace M. Culver
Attorney, Agent, or Firm—Price, Heneveld, Huizenga & Cooper

[57] ABSTRACT

A packaging machine for applying and securing a continuous web of material, especially of the heat sealable type, to containers, especially open-topped containers. The machine includes an intermittently rotatable cutter for severing the web between adjacent containers as well as a conveyor allowing mounting of interchangeable container supports of different sizes which cooperate with the cutter to rotate same to sever the web. The cutter need not be adjusted or modified when the container supports are changed and automatically accommodates the different sized supports.

28 Claims, 7 Drawing Figures

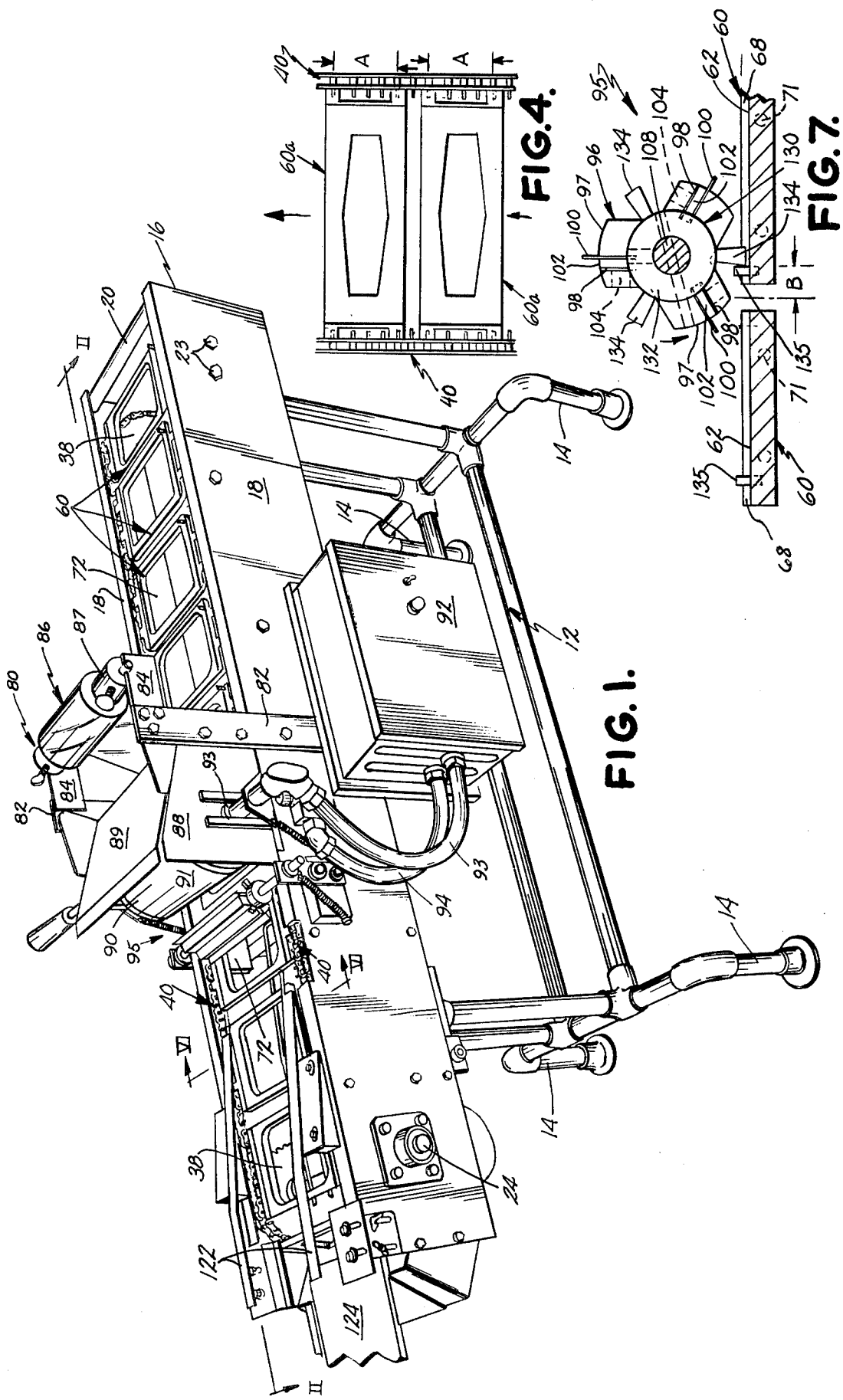

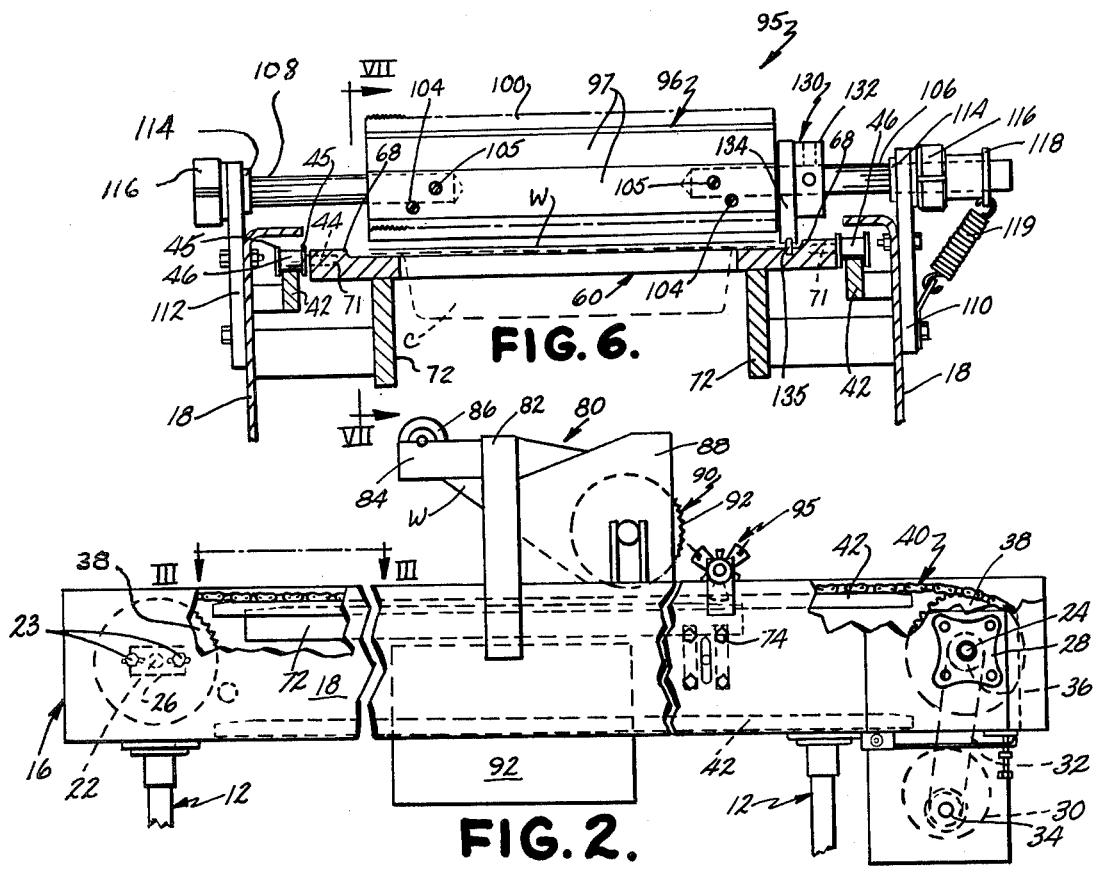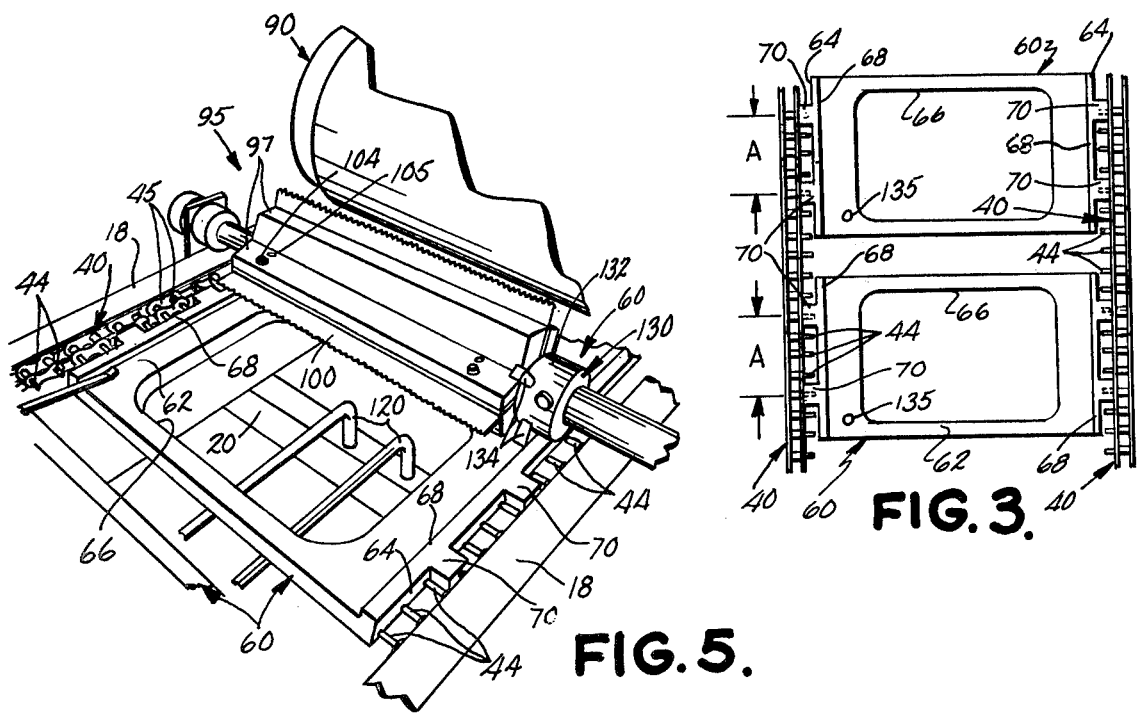

PACKAGING MACHINE WITH INTERCHANGEABLE CONTAINER SUPPORTS AND CAM-OPERATED CUTTER

BACKGROUND OF THE INVENTION

This invention relates to packaging machines, especially those of the type designed to apply and secure a web of material to containers, as well as to cutting mechanisms for severing the web of material between adjacent containers and to conveyors and container supports for such packaging machines.

It is well known to use a packaging machine to apply a continuous web of heat sealable film or other material to a series of containers supported on a conveyor. In all such machines, it is necessary to separate or sever the continuous web of material between adjacent containers after the web has been applied and secured to the container. Various types of severing or cutting devices have been used in the past with such machines with varying success.

One prior known type of cutter includes opposed cutting blades which are reciprocated toward and away from one another in order to shear the web of material at the desired location. Another type of cutter is that shown in U.S. Pat. No. 3,851,445 and includes a slitter which is reciprocated diagonally across a moving conveyor to cut the web of material. A third type of cutter is a continuously rotated cutter such as those shown in U.S. Pat. Nos. 3,436,894 or 3,706,183. With each of the above types of cutting or slitting assemblies, complex timing devices such as belts, chains, gears or extensive levers or the like were necessary to enable the appropriate shearing, slitting or severing action to take place properly between adjacent containers so as to avoid damage to either the container or the web material secured to the container.

A second problem encountered with the above type of packagers has been the inability or relative difficulty in modifying the packaging conveyor to support different sizes of containers. In the type of packager with which the present invention is concerned, open-topped, formed thermoplastic containers are slipped in apertures in generally horizontally extending plates secured in some fashion to a conveyor which carries them under a web applying and securing structure. As is apparent, various sizes and shapes of containers require different support plates having different sizes or shapes of receiving apertures. In prior packaging machines or conveyors, a change in container supports required substantial time and effort including either changing the conveyor support chains or other supporting devices, separate securement of different size plates with threaded fasteners and support brackets to the prior existing chains, or other time-consuming procedures. This, in itself, was a difficult and laborous operation which often necessitated a packaging concern to purchase two or three different packagers each with its own size container support plates in order to avoid the time consuming job of changing container supports.

The above changeover problems also resulted in problems with the cutting, shearing or slitting apparatuses for the continuous web material. In prior machines, if the container supports were changed or their locations modified to support different sizes of containers, adjustment and retiming of the cutting apparatus was also necessary. That is, either the chains, gears or levers which timed the shearing, slitting or continuously rotating cutting action of the prior known cutting assemblies had to be changed so that the cutting action occurred at the proper place and time with respect to the new container supports. This, too, added further time and labor expense to the conversion of the packager from one size container support to another.

In addition to the above problems, prior packaging machines utilized web-cutting assemblies which were often very complex and required frequent sharpening or normal maintenance even when the container supports were not changed. This resulted in frequent down time for the packager and additional expense for repairs.

The present invention was conceived in recognition of and as a solution for the above problems.

SUMMARY OF THE INVENTION

Accordingly, the present invention provides a packaging machine for applying and securing a continuous web of material to containers and having interchangeable container supports as well as a cutting or severing assembly which cuts or severs the web between the containers in a simple and efficient manner. The cutting assembly of the packager is intermittently rotatable and automatically adjusts to different sizes of container supports without need for any gearing or other changes for timing the cutting action with respect to the different sized container supports. In addition, the packager is uniquely adapted for supporting a range of sizes of container supports and for interchanging those different size container supports quickly and easily without modifying the basic conveyor in any sense. Once changed, the container supports cooperate with the cutting assembly without any adjustment of the cutter being necessary. The cutting assembly rotates intermittently as operated by the container supports thereby eliminating any complex operating mechanisms.

In one form, the invention is a packaging machine for applying and securing a web of material to containers including an intermittently rotatable cutter having at least three cutting edges spaced therearound, camming means offset from each of the cutting edges for rotating the cutter, and a projection on each of the container supports for engaging the camming means such that the projections and camming means rotate the cutter to bring the cutting edges into and out of the spaces between the container supports to sever the web of material.

In another aspect, the packager includes means for interchangeably mounting container supports of different sizes, the camming and projection means allowing cutting of the web material between the container supports without changing or adjusting the cutter.

In yet other aspects, the invention is a cutting apparatus for use with packaging machines of the type adapted for securing a web of material to a container including an intermittently rotatable cutter, support means for rotatably supporting the cutter immediately adjacent a conveyor having container supports thereon, and camming means cooperating with the cutter for intermittently rotating the cutter. The camming means include a camming projection for each of the cutting edges, each of the camming projections being offset circumferentially from its respective cutting edge. Projection means are also included projecting outwardly from the container supports which are adapted to be mounted on the said type of packaging machine conveyor for cooperation with the camming projections. The camming projections are successively engaged by the projection means on the container supports to intermittently rotate the cutter.

In more detailed aspects of the invention, the means for interchangeably mounting the container supports include a pair of parallel, endless conveyor chains including pivot pins at each joint of the chain. The pivot pins extend inwardly from the chain toward one another and receive container support plates having parallel end surfaces and spaced pairs of apertures in each end surface which are slidably and removably telescoped over the chain pins for mounting the plates. Regardless of the overall size of the container support, the spacing of the support apertures remains the same such that the same chains support a wide range of sizes of container supports.

The present invention has numerous advantages over prior known packagers and cutting assemblies for packagers. The intermittently, rotatable cutter is simply designed and easily maintainable and requires little or no attention during use. Means for intermittently rotatably camming the cutter are separately adjustable from the cutter should any initial adjustment be necessary. In addition, the blades of the cutter are easily changed to further reduce packager downtime. The conveyor for the packager allows rapid interchanging of the container supports. The chain including a pin extending inwardly at each joint allows a wide range of sizes of container supports to be mounted. The various sizes of container supports all cooperate well with the cutter to intermittently rotate the same without adjustment when changes are made. Although the spacing between the various sizes of container supports differs when the supports are changed, the intermittently, rotatable cutter easily accommodates a range of such spaces to avoid need for adjustment.

These and other objects, advantages, purposes and features of the invention will become more apparent from a study of the following description taken in conjunction with the drawings.

BRIEF DESCRIPTION OF THE DRAWINGS

FIG. 1 is a front, perspective view of the packaging machine incorporating the present invention;

FIG. 2 is a fragmentary, side elevation of the packaging machine of FIG. 1 with portions broken away to illustrate support of the conveyor chain;

FIG. 3 is a fragmentary, plan view of area III—III of FIG. 2 showing the packaging conveyor, the container supports and conveyor chain included therein;

FIG. 4 is a fragmentary, plan view of the same area of the packaging conveyor shown in FIG. 3 but with different container supports inserted between the supporting conveyor chains;

FIG. 5 is a fragmentary, perspective view of the intermittently rotatable, web-cutting assembly of the present invention;

FIG. 6 is a sectional, end elevation of the cutting assembly area of the packaging machine taken along plane VI—VI of FIG. 1;

FIG. 7 is a sectional, end elevation of the cutting assembly area of the packaging machine taken along plane VII—VII of FIG. 6;

DESCRIPTION OF THE PREFERRED EMBODIMENTS

Referring now to the drawings in greater detail, FIGS. 1 and 2 illustrate a packaging machine 10 incorporating the present invention. The packaging machine is of the type designed for applying and sealing a film or web W of heat sealable material to the top surfaces of a series of open-topped containers C (FIG. 2) supported by a conveyor in the packager 10. The packaging conveyor includes chains 40 supporting a plurality of container supports 60. The conveyor moves beneath a web applying and securing assembly 80 which applies and secures the sealable film W to containers in supports 60. The web is severed between containers by cutting assembly 95 after which the completely sealed containers are removed from the conveyor.

Packager 10 includes a tubular support frame 12 including a plurality of legs 14. The support frame 12 is secured to the underside of a conveyor support frame 16 including a pair of opposed, parallel, aligned conveyor support walls 18 running the length of the machine. Walls 18 are spaced apart by bracing channels 20 or the like and rotatably support a pair of spaced, conveyor support axles 22, 24. Conveyor support axle 22 is at the inlet or insertion end of the packaging machine and is mounted on horizontally adjustable, axle-securing plates 26 which support the axle 22 internally between the walls 18 and are adjustable via exterior bolts 23 as shown in FIGS. 1 and 2. At the outlet or exit end of the packaging machine is axle 24 supported by bearing pillow blocks 28 secured to the exterior of walls 18. Axle 24 is driven by a chain drive assembly including an electric motor 30 and a chain 32 extending around appropriate drive sprockets 34, 36, one being secured to the shaft of the motor and the other on the axle 24. Electrical power is supplied to motor 30 through cable 94 from control box 92 at one side of the packager. A second cable 93 transmits power to heating and sealing roller 90 in assembly 80. A relay may be included between cable 94 and motor 30 to sense the temperature of roller 90 and allow conveyor operation only when roller 90 is sufficiently hot to properly seal web W to the containers.

A spaced pair of chain support sprockets 38 is mounted on each axle 22, 24 adjacent the interior of walls 18 such that longitudinally spaced pairs of the sprockets on the two axles are aligned. Each longitudinally spaced pair of sprockets supports an endless conveyor chain 40 therearound (FIGS. 1-4). Intermediate the aligned pairs of sprockets, chains 40 are supported by chain support bars 42 secured adjacent the top and bottom edges of the conveyor support walls 18. Conveyor chains 40 each include inwardly extending pivot pins 44 (FIGS. 3-5) which extend through spaced pairs of chain side links 45 (FIGS. 5 and 6) as well as pivotally interconnecting the adjacent chain links. Pins 44 extend inwardly a distance equivalent to the distance between the chain side links. Each pair of chain pins 44 together with a pair of chain side links 45 forms an opening internally of the chain which receives a tooth on the drive sprockets 38 in the same manner that a bicycle chain is received on a sprocket in a bicycle. Chain pins 44 extend inwardly from each chain and are transversely aligned and coaxial with one another when mounted on sprockets 38. Between each pair of chain side links 45 is a spacing roller 46 (FIG. 6) which freely rotates about the portion of chain pin 44 between the side links. Rollers 46 are supported by chain support bars 42 which in turn are secured to but spaced from the interior surfaces of conveyor support walls 18 (FIG. 6). Accordingly, chains 40 are known as roller chains but also include inwardly extending pivot pins at each pivot joint of the chain.

Container support plates 60 are designed to be supported by spaced pairs of the inwardly extending chain pins 44 from chains 40 at intervals along the chains. As best seen in FIGS. 1, 3, 6 and 7, each container support plate 60 is generally rectangular and includes a generally flat or planar body section 62 having a length slightly less than the distance between the ends of the inwardly extending chain pins 44 as defined by parallel end surfaces 64. The width of the plate 60 is determined by the size of the aperture 66 formed within body 62 for receipt of an open-topped, rimmed, formed thermoplastic container C to be seated therein. The flat, planar portion of body 62 around aperture 66 firmly supports the rim of a container (FIG. 6) to allow for firm pressure of the sealing web W thereagainst during the sealing process.

Adjacent either end edge 64 of plates 60 is a raised flange 68 (FIGS. 3, 5 and 6). Formed integrally with flanges 68 are spaced, parallel projections 70 which extend outwardly from the end edges 64 and include chain pin-receiving apertures 71 (FIGS. 6 and 7) which are slightly larger than the pins themselves. As shown in FIG. 3, apertures 71 in projections 70 are spaced apart a predetermined distance A corresponding to the distance between every fourth chain pin 44 in the preferred embodiment. Pins 44 are received in apertures 71 with pins 44 on either side of those in apertures 71 received in the open spaces adjacent the projections 70 for clearance. The overall length of the container supports 60 between the end surfaces of projections 70 is slightly less than the distance between the innermost chain side links 45 of the opposing chains 40 as is best seen in FIGS. 3, 5 and 6. When mounted on the chains 40 as above, a space of predetermined width exists between the side edges of the adjacent plates (FIGS. 3 and 5). The chain pins fully support the plates such that they may be carried around the drive sprockets 38 as shown in FIG. 1.

In the area beneath the web applying and sealing assembly 80 as well as under the cutting assembly 95, two additional, spaced container plate support bars 72 are secured to but spaced inwardly from the internal surfaces of walls 18 beneath the conveyor (FIGS. 1, 2 and 6). The top surfaces of container support bars 72 slidingly support plates 60 and resist the downward pressure exerted against the support plates by the heating and sealing roller 90 (described hereinafter) against the upper surfaces of the containers and the plates. Bars 72 insure complete, firm attachment of the sealing material to the tops of the containers. Container support plate bars 72 may be adjusted vertically for proper relationship with the bottoms of the container supports via a vertically adjustable, bolted assembly 74 (FIG. 2).

The top surface of body portion 62 of each container support is, in effect, recessed with respect to the top surface of raised flange 68. This enables the pin-receiving apertures 71 in projections 70 to be located such that the pins 44 from the chains will have their top surfaces at approximately the same level as the top surface of container support body 62. Specifically, the vertical position of the top surface of body portions 62 of the container supports is located to move at a linear speed equal to the circumferential speed of sealing roller 90. This provides sufficient clearance for the rotating cutting edges of cutting assembly 95 to move into and out of the spaces between the plates as will be explained more fully hereinafter.

As shown in FIG. 4, chains 40 will also interchangeably support different sizes of container support plates such as those shown at 60a in FIG. 4. Container supports 60a are similar in all respects to container supports 60 except that apertures 66a are of a different size and shape and the overall width of the container supports is less than those of container supports 60. However, the spacing between the pin-receiving apertures in the end surfaces of container supports 60a is the same as those for container supports 60 meaning that they can be telescopically received on the integrally extending chain pins 44, i.e., every fourth pin, in the same manner as described above in connection with FIGS. 3 and 5. Further, the spacing between the container supports 60a is less than that between container supports 60 although the cutting assembly 95 will operate successfully without adjustment over a range of spacings between the plates including the spacings described for both plates 60 and 60A. In a like manner container support plates, which are wider than plates 60, can be interchangeably mounted on chains 40 without need for adjusting cutting assembly 95.

In the area designated by arrows III in FIG. 2, which is the area of the conveyor immediately upstream from web applying and sealing assembly 80 and shown in FIG. 3, chains 40 may be lifted off support bars 42 and moved or flexed laterally outwardly toward the interior surfaces of walls 18 to remove pins 44 from their corresponding apertures in plates 60 or 60a and to remove the plates from the conveyor. This simple method enables the container support plates to be interchanged as desired simply by (1) moving the conveyor to bring the plates to the area designated by arrows III, (2) flexing the chain, (3) removing the undesired plates, and (4) inserting the desired plates. The spacing of the apertures is the same in each plate, eliminating any need to change the conveyor chains 40. Moreover, since the conveyor chains have pins at every joint and the conveyor plates are generally uniformly of one width on the conveyor at any one time, the insertion of plates of different widths as described above will vary the spacing between the plates and the number of inwardly extending chain pins between the adjacent apertures on adjacent plates. For narrower plates, therefore, a greater number of plates can be received on the same conveyor chains 40 than with wider plates. For example, in a preferred embodiment, a #40 roller chain having a pitch of ½ inch (i.e., the spacing in inches between the inwardly extending pins or chain joints) is suitable for mounting container support plates at either 3½, 4, 5 or 7 inch cut-off intervals, i.e., 3½, 4, 5 or 7 inch distances between the mid-points of the spaces between the plates. In this example, the width of the plates is 3, 3½, 4⅝, or 6⅝ inches, respectively, while the spacing between the pin-receiving apertures remains the same at approximately 2 inches. The spacing between these respective plates when plates of a uniform size are received on the conveyor is, respectively, ½, ⅓, ⅜ or ⅜ inches. However, the cutting assembly 95 as explained hereinafter is well suited to sever the continuous web of material at the mid-point of the space between the plates for any of these spacings without adjustment.

As is best seen in FIGS. 1 and 2, the web applying and sealing assembly 80 is secured over the conveyor at approximately the mid-point of the packager 10. The assembly includes a pair of vertically upwardly extending support bars 82 on opposite sides of the conveyor which are bolted or otherwise secured to conveyor support walls 18. Extending rearwardly or upstream of the conveyor at the top of bars 82 are a pair of vertically oriented, parallel, aligned web roller support plates 84. The upper edges of these plates are notched to rotatably support a roll 86 of web material such as a heat sealable, thermoplastic film. The roll includes an axle 87 and a length of the web W wound about the axle. Extending forwardly from supports 82 are a pair of vertically oriented side plates 88, one on either side of the conveyor which rest on the top of walls 18 and rotatably support a heating and sealing roller 90. Roller 90 may be pivotally raised and lowered about one end 93 of its support axle out of and into contact with the top surfaces of containers C when they are supported in plates 60 or 60a. Roller 90 is continuously rotated by a sprocket 92 (FIG. 2) fixed to the support axle of the roller, which sprocket engages one of the parallel chains 40 at one end of the roller. As explained below, the pitch diameter of the sprocket which rotates roller 90 is aligned with the horizontal center line of chains 40 for proper operation of the packager. Roller 90 may include a covering of heat resistant rubber or other resilient material 91 on its circumferential surface for pressing and sealing the continuous web W of material against the succession of container top rims.

Referring now to FIGS. 5-7, cutting assembly 95 is shown in detail. The intermittently rotatably cutter includes an elongated, cylindrical cutting blade support member 96 having three equally circumferentially spaced, radially extending, elongated flanges 97 with curved outer or peripheral surfaces. Each of the radially extending, elongated ridges 97 extends outwardly from a common center portion of support 96 and includes an elongated slot 98 formed in the middle thereof and which receives a thin, elongated cutting blade 100. Cutting blades 100 have a width sufficient to extend out of slots 98 when mounted therein and a length longer than the container receiving apertures in the container supports. These blades are retained in the slots by clamping bars 102 (FIG. 7) which are forced against blades 100, which in turn forces the blades against one edge of the slots 98 by set screws 104 threaded into flanges 97 (FIG. 7). Accordingly, when the outer cutting edges of blades 100, which are preferably serrated, become dull, or otherwise damaged, such screws 104 may be loosened and blades 100 easily removed from their clamped position without further disassembly of the cutting assembly 95. This provides a significant savings in time allowing rapid substitution of sharpened blades when necessary.

It has been found that three, equally circumferentially spaced, blades or edges on support 96 provides best results in the invention. Two blades 180° apart would not allow proper cutting between each adjacent pair of supports 60 or 60a. Four or more blades requires a much larger diameter support than support 96.

Cutting blade support member 96 is fixedly secured to a pair of coaxial stub shafts 106, 108 by roll pins 105 or the like such that it is rotational therewith. Stub shafts 106, 108 are in turn rotatably supported immediately downstream of assembly 80 by bearing support bars 110, 112 which are bolted to conveyor support walls 18 on opposite sides of the conveyor. Bars 110, 112 include elongated holes through which the bolts extend and which allow vertical adjustment of the position of shafts 106, 108 and, thus, cutting blade support 96 and blades 100. This allows adjustment of the vertical distance between the axis of stub shafts 106, 108 and the top surfaces of the container support. This, in turn, provides clearance for entry and exit of the blades 100. Stub shafts 106, 108 extend through suitably sized apertures in bars 110, 112 which in turn receive lubricious bushings 114 through which the stub shafts extend. Bushings 114 are held in place by removable collars 116 secured to the stub shafts. Shaft 106 is somewhat longer than shaft 108 and also includes a bronze bushing 118 telescoped over its end outside bar 110 and collar 116. Bushing 118 is secured by a coil spring 119 to bar 110 or support wall 118 to urge bushing 118 against shaft 106. The frictional interengagement between bushing 118 and shaft 106 resists rotation of the cutting blade support member 96 and blades 100 and prevents "freewheeling" of the assembly except when positively engaged by the upwardly extending pin 135 from a container support plate 60 or 60a engaging camming member 130 as described hereinafter.

Adjacent one end of cutting blade support member 96 is secured a cylindrical camming member 130 (FIGS. 5-7) in a fixed position on shaft 106 by a pair of set screws or the like. Camming member 130 includes a central, cylindrical support 132 having a central aperture therethrough on its cylindrical axis through which shaft 106 is received. Extending radially outwardly at three equally, circumferentially spaced positions around support 132 are radial camming projections 134. Each camming projection 134 has a length sufficient to extend close to the top surface of one of the container support plates 60 or 60a such that it can be engaged by an upwardly extending projection pin 135 secured in the container support plate. As will be seen from FIGS. 5 and 7, camming projections 134 are offset downstream of their respective cutting blades 100 such that when engaged by pins 135, the camming projections will cause rotation of the cutting blade support member on shafts 106, 108 and against the resistance of bushing 118 to swing the blade 100 which is immediately upstream of that camming projection into the space between the adjacent container support plates. This severs the entire width of the web material which has been previously secured to the containers.

As mentioned above, each of the container support plates 60, 60a or the like includes a single, upwardly projecting pin 135 adjacent the upstream side edge of the plate on the side on which the camming member 130 is located. Pins 135 are force fitted into corresponding bores in the upper surfaces of the support plates such that they project perpendicularly upwardly from the top surface of each plate a distance sufficient to engage one of the camming projections 134 of camming member 130. The lateral position of each pin is such that it can make that engagement. As shown in FIG. 7, as the conveyor moves the container support plates forwardly, the single pin 135 on each of the container support plates engages the rear surface of one of the camming projections 134 with its leading edge surface and causes rotation of the cutting blade support member 96 in the same direction in which the conveyor is moving (counterclockwise in FIG. 7). That engagement and rotation swings and rotates the cutting blade 100, which is immediately upstream from the camming projection engaged by pin 135, into the space between the plates. The distance from the center line of the space between the plates to the leading edge of the pin 135 which contacts camming projection 134 (dimension B in FIG.

7) is such that blade 100 will be extending vertically downwardly beneath the axis or center line of shafts 106, 108 at the exact time that the center line of the space between plates 60 is aligned with the axis or center line of shafts 106, 108. This insures proper severance of the sealing web between the plates and yet provides sufficient clearance for the blade to move into the space and out again as the plates continue to move along the conveyor. In addition, cutting blades 100 aid rotation of cutting blade support member 96. Pin 135 moves camming projection 134, and thus support member 96, until blade 100 is nearly completely out of the space between two adjacent container support plates. Blades 100 lightly brush against the upper corner of the leading edge of the following container support plate to complete rotation of member 96 and blade 100 out of that space and to help position the next camming projection 134 for engagement by the next pin 135.

As mentioned above in the specific example, cutoff widths of 3½, 4, 5 and 7 inches measured between center lines of the spaces between the plates are possible using a single #40 chain having pivot pins at one half inch distances along the chain. Spaces between the plates in this example can vary between ⅝ inches and ¾ inches with the blade 100 being properly swung into and out of that space all without any adjustment of the cutting assembly 95 including both camming member 130 or pins 135. Accordingly, the cutting blade support member 96 is rotated intermittently, i.e., only when one of the pins 135 engages one of the camming projections 134 to rotate the next adjacent cutting blade 100 into a space between and immediately behind the container support plate 60 or 60a on which the pin which engages this camming projection is mounted.

As shown in FIGS. 5 and 7, the offset of each camming projection 134 from its respective cutting blade 100 is adjusted when the cutting blade support 96 and cutting assembly 95 are first mounted on the packaging machine. The relationship is such that the blade 100 will be extending exactly vertically, downwardly and is centered in the space between adjacent plates 60 or 60a when the center line of that space between the plates is aligned with the axis of the cutting blade support member 96. That adjustment need not be changed even though the container support members or plates 60 or 60a are changed during use of the packaging machine since the one setting accommodates and positions the blade for cutting for spaces between ⅝ to ¾ inches with a #40 chain. The blade 100 projects outwardly approximately ⅝ inch from the surface of the radially extending flange 97 in the preferred example.

Accordingly, the present invention provides the ability to interchange container support plates to accommodate differing sizes of containers quickly and easily and yet automatically compensates to cut the continuous web of material intermediate any of such plates without adjustment or time-consuming modifications. The cutting assembly itself is simple and reliable while the blades in the cutting assembly are easily removable for repair or replacement.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. A packaging machine for applying and securing a web of material to containers comprising:
   conveyor means for supporting and conveying containers in one direction along a path, said conveyor means including a plurality of spaced container support members mounted thereon;
   web applying and securing means for applying and securing a continuous web of material to the containers supported by said conveyor means; and
   cutting means for separating said web of material intermediate said container support members; said cutting means including a rotatable cutter having at least three cutting edges equally spaced and secured in fixed positions around the exterior thereof and extending across said conveyor means, support means for rotatably supporting said cutter transversely across and immediately above said conveyor means, said support means including camming means for intermittently rotating said cutter in a circular path, said camming means being offset circumferentially from said cutting edges; said container support members each including single projecting means for engaging said camming means to intermittently rotate said cutter such that said cutting edges are brought into position between said container support members to sever said web of material therebetween.

2. The packaging machine of claim 1 wherein said rotatable cutter includes a cutting blade support member, said cutting edges comprising at least three elongated, cutting blades removably secured on said cutting blade support member.

3. The packaging machine of claim 2 wherein said cutting blade support member includes an elongated slot for each of said cutting blades, said slots opening outwardly toward the periphery of said cutting blade support member and receiving one of said cutting blades therein such that its cutting edge extends beyond said periphery; retaining means for securing each of said blades in one of said slots.

4. The packaging machine of claim 3 wherein said cutting blade support member is an elongated cylinder having at least three equally circumferentially spaced, radial flanges extending parallel to the cylinder axis, each radial flange including one of said blade receiving slots; said retaining means including a clamping bar received in said slot adjacent said blade and fastening means for urging said bar and blade toward and against a side of said slot to clamp them in place.

5. The packaging machine of claims 1 or 2 including means for adjustably securing said camming means to said rotatable cutter such that the position of said camming means may be adjusted to properly intermittently rotate said cutter and cutting edges with respect to said container supports.

6. The packaging machine of claim 1 wherein said support means include shaft means secured to said rotatable cutter for suspending said cutter over said conveyor means, bearing support means for rotatably supporting said shaft means; said camming means being secured to said shaft means adjacent one end of said cutter.

7. The packaging means of claim 6 wherein said camming means include a cam support adjacent one end of said rotatable cutter having an aperture therethrough with said shaft means telescoped through said aperture and secured therein and at least three camming projections extending radially outwardly of said cam support, each camming projection having a length sufficient to extend adjacent the top surface of one of said container support members, said cam support positioned on said shaft such that said camming projections are offset circumferentially from said blades so as to engage said projection means on one of said container support members downstream of one of said blades and rotate said one blade between said one container support member and the next adjacent container support member.

8. The packaging machine of claim 6 including means on said shaft means for resisting rotation of said cutter to prevent mispositioning thereof by freewheeling after engagement by said projecting means.

9. The packaging machine of claim 6 or claim 1 wherein said camming means include a camming projection adjacent but offset circumferentially from each of said cutting edges whereby said camming projections will successively engage said projection means on said container support members downstream of said cutting edges with respect to said direction of movement along said conveyor path, and rotate said cutter and said cutting edges successively between said container support members to sever said web of material.

10. The packaging machine of claim 1 wherein said projection means include a single pin projecting upwardly from each of said container support members, each of said pins being located a predetermined distance from the upstream edge of one of said container support members with respect to said direction of movement along said conveyor path.

11. The packaging machine of claim 1 wherein said conveyor means includes means for interchangeably mounting container supports of different sizes, said camming and projection means allowing proper rotation and cutting of said web material between said container supports without changing or adjusting said cutter even when different sizes of container supports are used.

12. The packaging machine of claim 1 wherein said conveyor means includes a pair of parallel, endless conveyor chains including pivot pins at each joint of said chain, said pivot pins extending inwardly from each chain toward one another and being axially aligned across said conveyor means with one another, drive means for driving said chains in a closed path in one direction and chain support means for supporting said chains along one portion of said path at a predetermined level below said web applying and sealing means and said cutting means; said container support members each including a generally flat plate having a predetermined width, parallel end surfaces defining the length of said plate, and a pair of spaced apertures in each of said end surfaces, said plates being received intermediate said chains with said chain pins slidably and removably received in said plate end surface apertures such that different sizes of plates may be interchangeably supported by said chains with the spacing between said plates depending on the width of said plates.

13. Cutting apparatus in a packaging machine of the type adapted for applying and securing a web of material to a container comprising:
a rotatable cutter including at least three equally circumferentially spaced cutting edges secured in fixed positions thereon;
a conveyor having spaced container supports thereon which are adapted to support containers to which a continuous web of material is adapted to be applied and secured; support means for rotatably supporting said cutter immediately adjacent said conveyor; camming means cooperating with said cutter for intermittently rotating said cutter, said camming means including a camming projection for each of said cutting edges, each of said camming projections being offset circumferentially from its respective cutting edge;
projection means projecting outwardly from said container supports for cooperation with said camming projections, one of said projection means being located on each of the container supports, whereby said camming projections are successively engaged by said projection means during operation of the conveyor for intermittent rotation of said cutter such that said cutting edges will rotate through the plane of the web material to sever the material between adjacent ones of said container supports.

14. The cutting apparatus of claim 13 wherein said rotatable cutter includes a cutting blade support member, said cutting edges comprising at least three elongated, cutting blades removably secured on said cutting blade support member.

15. The cutting apparatus of claim 14 wherein said cutting blade support member includes an elongated slot for each of said cutting blades, said slots opening outwardly toward the periphery of said cutting blade support member and receiving one of said cutting blades therein such that its cutting edge extends beyond said periphery; retaining means for securing each of said blades in one of said slots.

16. The cutting apparatus of claim 15 wherein said cutting blade support member is an enlongated cylinder having at least three equally circumferentially spaced radial flanges extending parallel to the cylinder axis, each radial flange including one of said blade receiving slots; said retaining means including a clamping bar received in said slot adjacent said blade and fastening means for urging said bar and blade toward and against a side of said slot to clamp them in place.

17. The cutting apparatus of claim 13 wherein said support means include shaft means secured to said rotatable cutter; said camming means including a cam support adjacent one end of said rotatable cutter having an aperture therethrough with said shaft means telescoped through said aperture and secured therein and at least three camming projections extending radially outwardly of said cam support, each camming projection having a length sufficient to extend adjacent the top surface of one of said container support members, said cam support positioned on said shaft such that said camming projections are offset circumferentially from said blades so as to engage said projection means on one of said container support members downstream of one of said blades and rotate said one blade between said one container support member and the next adjacent container support member.

18. The cutting apparatus of claim 13 including means for resisting rotation of said rotatable cutter to prevent mispositioning thereof by freewheeling after engagement by said projection means.

19. The cutting apparatus of claim 13 wherein each of said container supports has a support surface for a container to be received therein;

said projection means including a plurality of pins adapted to be affixed to said container supports such that they project normally to the support surface of such supports.

20. The cutting apparatus of claim 13 including means for adjustably securing said camming means to said rotatable cutter such that the position of said camming means may be adjusted to properly intermittently rotate said cutter and cutting edges with respect to said container supports.

21. A packaging machine for applying and securing a web of material to containers comprising:
conveyor means for supporting and conveying containers in one direction along a path, said conveyor means including a plurality of spaced, container supports mounted thereon;
web applying, securing and cutting means for applying and securing a continuous web of material to the containers supported by the container supports as they move along said conveyor means and for severing said web between said container supports;
said container supports being uniform, said web applying, securing and cutting means including an intermittently rotatable cutter having at least three cutting edges spaced therearound and secured in fixed positions, camming means offset from each of said cutting edges for rotating said cutter, and a single projection on each of said container supports for engaging said camming means whereby said projections and camming means rotate said cutter such that said cutting edges rotate into and out of the spaces between said container supports to sever the web of material therebetween;
said conveyor means includes means for interchangeably mounting container supports of different sizes, said camming and projection means allowing proper rotation of said cutter and proper cutting of said web material between said container supports without changing or adjusting said cutter even when different sizes of container supports are used.

22. A packaging machine for applying and securing a web of material to containers comprising:
conveyor means for supporting and conveying containers in one direction along a path, said conveyor means including a plurality of spaced, container supports mounted thereon;
web applying, securing and cutting means for applying and securing a continuous web of material to the containers supported by the container supports as they move along said conveyor means and for severing said web between said container supports;
said conveyor means including a pair of parallel, endless conveyor chains including pivot pins at each joint of said chain, said pivot pins extending inwardly from each chain toward one another and being axially aligned across said conveyor means with one another, drive means for driving said chains in a closed path in one direction, and chain support means for supporting said chains along one portion of said path at a predetermined level below said web applying, securing and cutting means;
said container supports each including a pair of end surfaces with a pair of spaced apertures in each end surface, said supports being received intermediate said chains such that they extend transversely therebetween, a spaced pair of said chain pins slidably and removably received in said support end surface apertures; means on said container supports for providing clearance for pins on said chain not received in said apertures; said chains being sufficiently flexible laterally of said supports to allow insertion and removal of said supports at at least one position along said conveyor path whereby different sizes of container supports each with the same spacing of apertures in their end surfaces may be interchangeably inserted and removed from said chains at at least said one position with the spacing between said supports depending on the width of said supports.

23. The packaging apparatus of claim 22 wherein said container supports comprise generally flat plates having container receiving apertures therein and raised flanges adjacent and parallel to each end surface on the top surface of said plates.

24. The packaging apparatus of claim 22 wherein said container supports include recesses in said end surfaces adjacent each of said apertures in said end surfaces whereby any inwardly extending chain pins adjacent those received in said apertures will be received in said recesses for clearance.

25. The packaging machine of claim 22 wherein said container supports are uniform, said web applying, securing and cutting means including an intermittently rotatable cutter having at least three cutting edges spaced therearound and secured in fixed positions, camming means offset from each of said cutting edges for rotating said cutter, and a single projection on each of said container supports for engaging said camming means whereby said projections and camming means rotate said cutter such that said cutting edges rotate into and out of the spaces between said container supports to sever the web of material therebetween without need for adjustment regardless of the size of the uniform container supports on said conveyor means.

26. The packaging machine of claim 9 wherein said projection means include a single pin projecting upwardly from each of said container support members, each of said pins being located a predetermined distance from the upstream edge of one of said container support members with respect to said direction of movement along said conveyor path.

27. The packaging machine of claim 5 wherein said conveyor means includes means for interchangeably mounting container supports of different sizes, said camming and projection means allowing proper rotation and cutting of said web material between said container supports without changing or adjusting said cutter even when different sizes of container supports are used.

28. A packaging machine for applying and securing a web of material to containers comprising:
conveyor means for supporting and conveying containers in one direction along a path, said conveyor means including a plurality of spaced, container supports mounted thereon;
web applying and securing means for applying and securing a continuous web of material to the containers supported by the container supports as they move along said conveyor means;
cutting means for severing said web between said container supports;
said conveyor means including a pair of parallel, endless conveyor chains including pivot pins at each joint of said chains, said pivot pins extending inwardly from each chain toward one another and being axially aligned across said conveyor means with one another, drive means for driving said chains in a closed path in one direction, and chain support means for supporting said chains along one portion of said path at a predetermined level below said web applying and securing means and said cutting means;

said container supports each including opposite ends, said opposite ends each having pin receiving means for removably receiving a pair of said pivot pins therein; means on said container supports for providing clearance for pins on said chain not received in said pin receiving means; said supports being received intermediate said chains such that they extend transversely therebetween; said chains being sufficiently flexible laterally of said supports to allow insertion and removal of said supports at at least one position along said conveyor path whereby different sizes of container supports each with the same pin receiving means in their opposite ends may be interchangeably inserted and removed from said chains at at least said one position with the spacing between said supports depending on the width of said supports.

* * * * *

Disclaimer

4,196,561.—*Gary L. Kruse*, Spring Lake, Mich. PACKAGING MACHINE WITH INTERCHANGEABLE CONTAINER SUPPORTS AND CAM-OPERATED CUTTER. Patent dated Apr. 8, 1980. Disclaimer filed Apr. 17, 1981, by the assignee, *Dake Corp., Division of JSJ Corp.*

Hereby enters this disclaimer to claims 22-24 and 28 of said patent.
[*Official Gazette August 18, 1981.*]